US011734021B2

(12) United States Patent
Griffin et al.

(10) Patent No.: US 11,734,021 B2
(45) Date of Patent: Aug. 22, 2023

(54) AUTOMATED RUNTIME SERVICE OPTIMIZATION VIA MODIFICATION OF A CONFIGURATION FILE

(71) Applicant: Red Hat, Inc., Raleigh, NC (US)

(72) Inventors: Leigh Griffin, Waterford (IE); Brendan O'Farrell, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 320 days.

(21) Appl. No.: 17/128,310

(22) Filed: Dec. 21, 2020

(65) Prior Publication Data

US 2022/0197671 A1   Jun. 23, 2022

(51) Int. Cl.
*G06F 9/445* (2018.01)
*G06F 8/60* (2018.01)
*G06F 8/71* (2018.01)
*G06F 9/48* (2006.01)

(52) U.S. Cl.
CPC ............ *G06F 9/44505* (2013.01); *G06F 8/60* (2013.01); *G06F 8/71* (2013.01); *G06F 9/485* (2013.01)

(58) Field of Classification Search
CPC .......... G06F 8/60; G06F 8/71; G06F 9/44505; G06F 9/485; G06F 9/4881
See application file for complete search history.

(56) References Cited

U.S. PATENT DOCUMENTS

| 7,861,238 | B2 | 12/2010 | Saadi et al. | |
| 9,075,633 | B2* | 7/2015 | Nos | G06F 16/1873 |
| 11,182,140 | B2* | 11/2021 | Riek | G06F 8/63 |
| 2020/0379742 | A1* | 12/2020 | Saluja | G06F 9/44505 |

OTHER PUBLICATIONS

Khan, Benish, "6 optimization tips for your CI configuration," https://circleci.com/blog/six-optimization-tips-for-your-config/, Jun. 16, 2020, 14 pages.

* cited by examiner

*Primary Examiner* — Terrell S Johnson
(74) *Attorney, Agent, or Firm* — Dority & Manning, P.A.

(57) ABSTRACT

Automated runtime service optimization via modification of a configuration file is disclosed. A first configuration file is analyzed to identify at least one service to be initiated for use by a first application identified in the first configuration file. Service information identifying one or more service processes currently executing on the computing device is obtained. It is determined that the at least one service is currently executing as a first service process of the one or more service processes on the computing device. The first configuration file is modified to inhibit a subsequent execution of the at least one service, and to reference the first service process on the computing device, such that the first application, when initiated as a first application process, utilizes the first service process.

20 Claims, 14 Drawing Sheets

AUTOMATED RUNTIME SERVICE OPTIMIZATION VIA MODIFICATION OF A CONFIGURATION FILE

BACKGROUND

Many complex applications require one or more services to function properly. Such services are often software packages implemented by companies that specialize in a particular type of service, such as logging, identity management, databases, and the like. Such complex applications are often initiated in a series of steps that are identified in a configuration file and that are often initiated in sequence due, in part, to dependencies such as services. The configuration file may identify, for example, the services that are required, the locations of the services, memory requirements, files, and the application that is to be executed. When the application is to be initiated, a configuration file processor processes the configuration file and initiates the services identified in the configuration file and the application.

SUMMARY

The examples disclosed herein implement automated runtime service optimization via modification of a configuration file.

In one example a method is disclosed. The method includes analyzing, by a computing device, a first configuration file to identify at least one service to be initiated for use by a first application identified in the first configuration file. The method further includes obtaining, by the computing device, service information identifying one or more service processes currently executing on the computing device. The method further includes determining that the at least one service is currently executing as a first service process of the one or more service processes on the computing device. The method further includes modifying the first configuration file to inhibit a subsequent execution of the at least one service, and to reference the first service process on the computing device, such that the first application, when initiated as a first application process, utilizes the first service process.

In another example a computing device is disclosed. The computing device includes a memory, and a processor device coupled to the memory to analyze a first configuration file to identify at least one service to be initiated for use by a first application identified in the first configuration file. The processor device is further to obtain service information identifying one or more service processes currently executing on the computing device. The processor device is further to determine that the at least one service is currently executing as a first service process of the one or more service processes on the computing device. The processor device is further to modify the first configuration file to inhibit a subsequent execution of the at least one service, and to reference the first service process on the computing device, such that the first application, when initiated as a first application process, utilizes the first service process.

In another example a non-transitory computer-readable storage medium is disclosed. The non-transitory computer-readable storage medium includes executable instructions to cause a processor device to analyze a first configuration file to identify at least one service to be initiated for use by a first application identified in the first configuration file. The instructions further cause the processor device to obtain service information identifying one or more service processes currently executing on the computing device. The instructions further cause the processor device to determine that the at least one service is currently executing as a first service process of the one or more service processes on the computing device. The instructions further cause the processor device to modify the first configuration file to inhibit a subsequent execution of the at least one service, and to reference the first service process on the computing device, such that the first application, when initiated as a first application process, utilizes the first service process.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
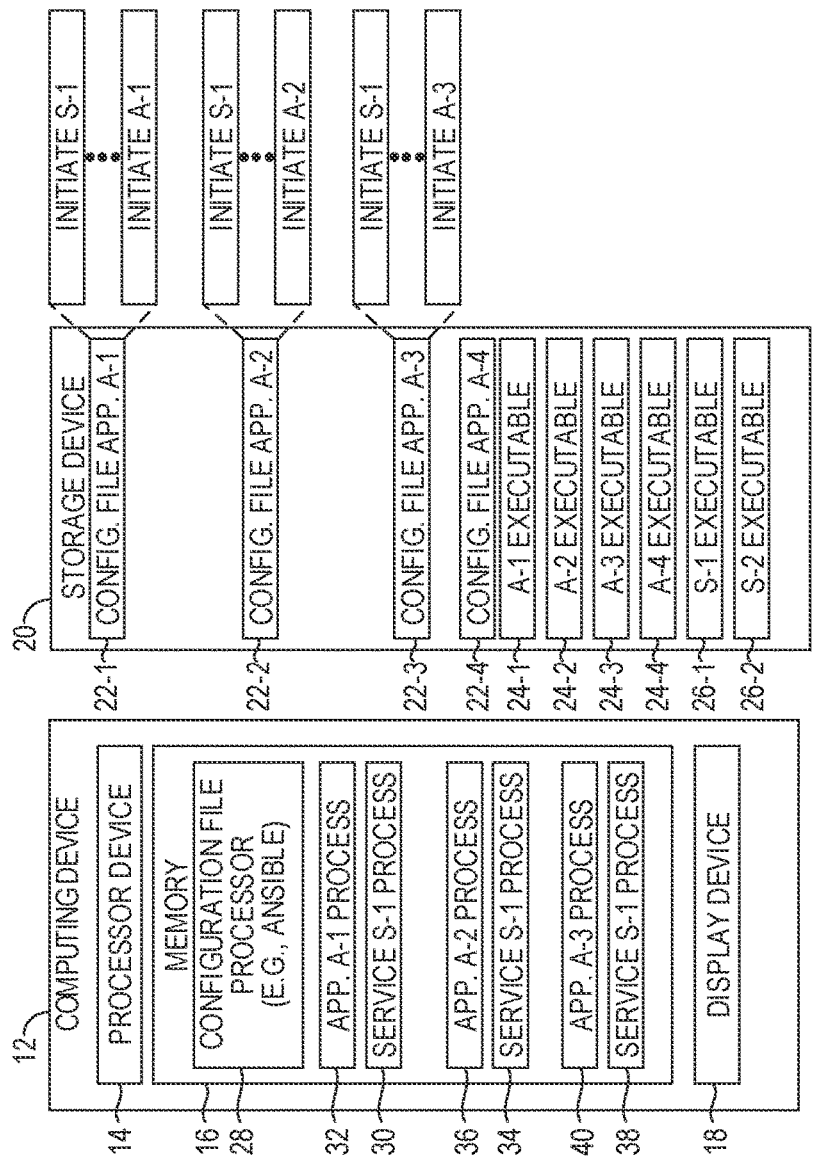
FIG. 1 is a block diagram of an environment.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Many complex applications require one or more services to function properly. Such services are often software packages implemented by companies that specialize in a particular type of service, such as logging, identity management, databases, and the like. Such complex applications are often initiated in a series of steps identified in a configuration file. The configuration file may identify, for example, a location of a service, which may be a local location or a remote location, a version of the service to install, what options to utilize with the service, pre-actions or post-actions associated with use of the service, such as the creation of a folder, creation of a symlink, the deletion of files, memory requirements, and the like. The configuration file also identifies the application that is to be executed and may include some of the same information discussed above with regard to a service. When the application is to be initiated, a configuration file processor processes the configuration file and initiates the services identified in the configuration file and the application.

Often an entity, such as a business, requires developers to utilize a service that is manufactured by a particular manufacturer. For instance, a business may require its developers to rely on Ajax database software when developing applications that utilize databases, and on Acme identity management software when developing applications that require authentication. In such an environment, multiple applications may be executing on a computing device concurrently, and many of such applications may be using the same service from the same manufacturer. Unfortunately, each application executes its own instance (e.g., executing process) of the service. Thus, there may be five database processes executing on the computing device, all of them Ajax database processes. One or more of the Ajax database processes may be different versions. Each database process requires a separate memory space and utilizes processor cycles when executing. In a large entity, developers of one application may have little interaction with developers of another application, and have no practical way to know what applications are using which services. Yet, if each of the developers were aware of the use of the Ajax database by each other developer, it might be possible for a particular version of a single Ajax database instance to support each of the five different applications, greatly reducing memory and processor requirements.

The examples disclosed herein implement automated runtime service optimization via modification of a configuration file. The examples automatically, without human involvement, detect when a configuration file indicates a service is to be initiated that has already been initiated as an executing service process by another application. The examples modify the configuration file to refer to the executing service process in lieu of initiating an additional service process. The configuration file may then be processed to initiate the application, and the application is initiated as an application process that utilizes the existing service process. The examples reduce memory usage and processor utilization that would otherwise be required to execute multiple copies of the same service and thus allow a computing device to execute additional processes.

FIG. 1 is a block diagram of an environment 10. The environment 10 includes a computing device 12, which in turn includes a processor device 14, a memory 16, and a display device 18. The computing device 12 includes, or is communicatively coupled to, a storage device 20. The storage device 20 includes a plurality of configuration files 22-1-22-4 (generally, configuration files 22). The configuration files 22, sometimes referred to as job files, contain a plurality of instructions for initiating an application, or multiple applications, and one or more services that are to be initiated for use by the one or more applications. The storage device 20, or some other storage device communicatively coupled to the computing device 12, also includes a plurality of application executable files 24-1-24-4, each of which corresponds to an application, and which are used to initiate an application process in the memory 16. The storage device 20, or some other storage device communicatively coupled to the computing device 12, may also include a plurality of service executable files 26-1-26-2, each of which corresponds to a service, and which are used to initiate a service process in the memory 16.

The configuration files 22 may contain instructions that are in a particular syntax associated with a particular configuration file processor 28. In some implementations, the configuration files 22 may comprise Ansible® playbooks, and may be YAML Ain't Markup Language (YAML) files that contain instructions in an Ansible® syntax. When an application is to be initiated, the configuration file processor 28 may be directed to process a particular configuration file 22 that initiates the application. The configuration files 22 may be processed sequentially, one instruction at a time. The configuration file processor 28 reads the configuration file 22 and carries out the instructions in the configuration file 22, including the initiation of one or more services and one or more applications.

The configuration file 22-1 has instructions for initiating an identity management service S-1, and an application A-1. Services, as discussed herein, have a service type attribute, which is the type of the service, such as a database service, an identity management service, a logging service, or the like. Services also have a service identifier attribute which is a name of the service, such as Oracle, Keycloak, or the like. For purposes of illustration, service identifiers used herein include S-1, S-2 and the like. In some implementations, a service may also have a version attribute that identifies a particular version of the service, such as version 1, version 2, or the like.

The configuration file 22-2 has instructions for initiating the identity management service S-1, and an application A-2, and the configuration file 22-3 has instructions for initiating the identity management service S-1, and an application A-3. Over a period of time, in this example, the configuration file processor 28 is instructed to process the configuration files 22-1-22-3. In response, the configuration file processor 28 processes the configuration file 22-1 and initiates a service process 30 from the service executable file 26-1 and an application process 32 from the application executable file 24-1. The configuration file processor 28 processes the configuration file 22-2 and initiates a service process 34 from the service executable file 26-1 and an application process 36 from the application executable file 24-2. The configuration file processor 28 processes the configuration file 22-3 and initiates a service process 38 from the service executable file 26-1 and an application process 40 from the application executable file 24-3. Note that the service processes 30, 34, and 38 are all executed from the same service executable file 26-1 and provide the same service to three different application processes 32, 36, and 40. Each of the service processes 30, 34, and 38 utilize portions of the memory 16 and processor cycles of the processor device 14.

Figure 2A:
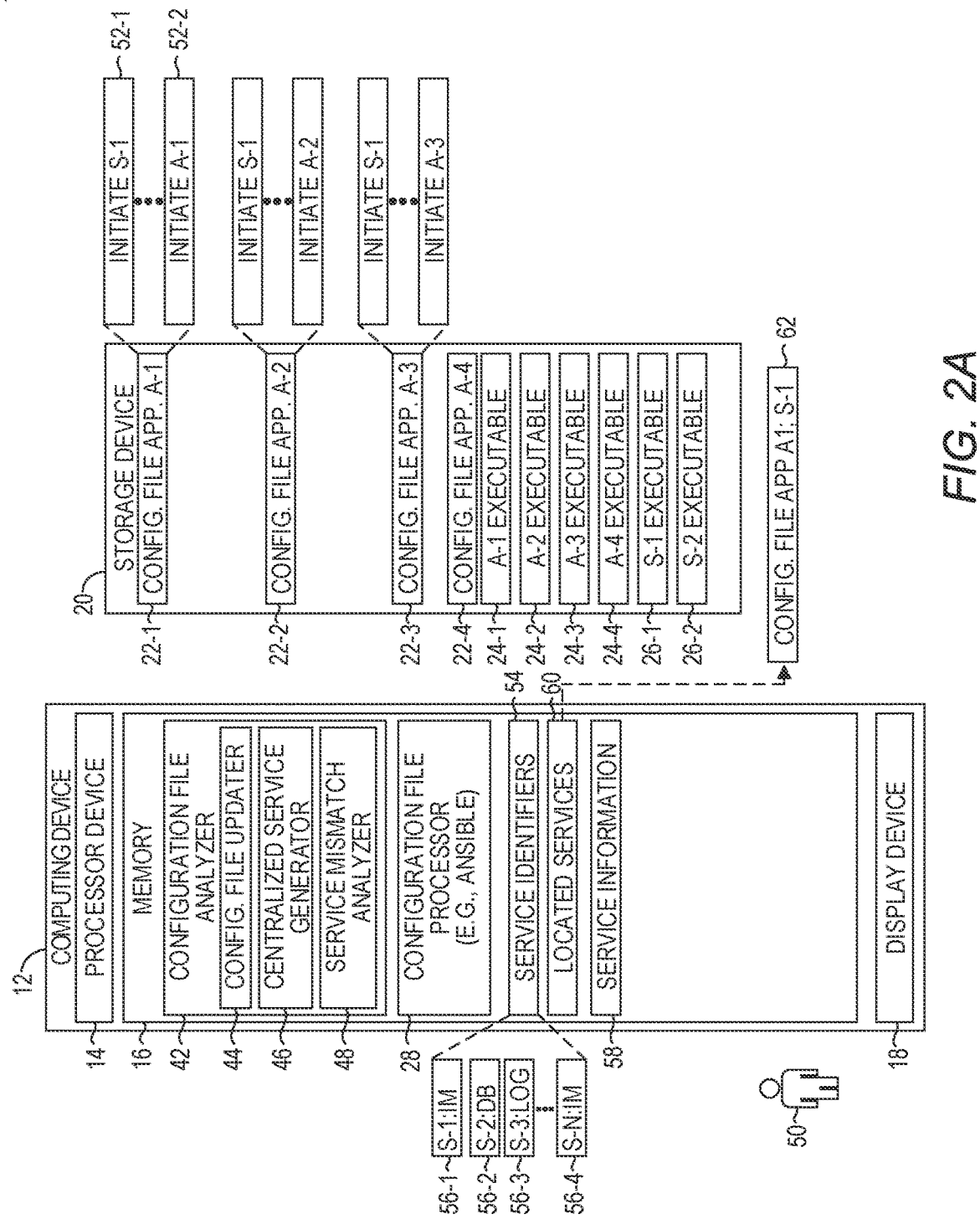
FIGS. 2A-2D are block diagrams of the environment illustrated in FIG. 1 that is suitable for implementing automated runtime service optimization via modification of a configuration file, according to one implementation.

FIGS. 2A-2D are block diagrams of the environment 10 suitable for implementing automated runtime service optimization via modification of a configuration file 22, according to one implementation. Referring first to FIG. 2A, in this example the computing device 12 includes a configuration file analyzer 42 that operates to analyze one or more of the configuration files 22. In some implementations, the configuration file analyzer 42 is multi-modal, and has a runtime, dynamic mode wherein the configuration file analyzer 42 analyzes a configuration file 22 in conjunction with a request to process a configuration file 22 to initiate an application. For example, the configuration file processor 28 may receive a request to process a configuration file 22, and the configuration file processor 28 may, prior to processing the configuration file 22, cause the configuration file analyzer 42 to analyze the configuration file 22. It should be noted that, although the configuration file analyzer 42 is illustrated as being separate from the configuration file processor 28, in other implementations the configuration file analyzer 42 may be a component of the configuration file processor 28.

The configuration file analyzer 42 may also have a static analysis mode wherein the configuration file analyzer 42 analyzes configuration files 22 to identify configuration files 22 that may be modified to utilize a same service when the configuration files 22 are next processed by the configuration file processor 28. The configuration file analyzer 42 may also, when in the static analysis mode, output information identifying configuration files 22 that may be suitable for utilizing a same service if certain modifications are made.

Solely for purposes of illustration, certain functionality of the configuration file analyzer 42 may be discussed herein as being implemented by certain components, such as a configuration file updater 44, a centralized service generator 46, and a service mismatch analyzer 48; however, it is apparent that the configuration file analyzer 42 can implement the functionality discussed herein with a greater number of components or a fewer number of components. Accordingly, the functionality described herein as being implemented by the configuration file updater 44, the centralized service generator 46, or the service mismatch analyzer 48 may be attributed generally to the configuration file analyzer 42. Moreover, because the configuration file analyzer 42 itself is a component of the computing device 12, functionality implemented by the configuration file analyzer 42 may be attributed to the computing device 12 generally. In examples where the configuration file analyzer 42 comprises software instructions that program the processor device 14 to carry out functionality discussed herein, functionality implemented by the configuration file analyzer 42 may be attributed herein to the processor device 14.

For purposes of illustration, assume that the configuration file processor 28 receives an instruction, either programmatic or manually from an operator 50, to process the configuration file 22-1 in order to initiate the application A-1. Prior to processing the configuration file 22-1, the configuration file processor 28 causes the configuration file analyzer 42 to analyze the configuration file 22-1.

The configuration file 22-1 contains instructions 52-1 that, when processed, instruct the configuration file processor 28 to initiate a service S-1 from the service executable file 26-1, and instructions 52-2 that, when processed, instruct the configuration file processor 28 to initiate the application A-1 from the application executable file 24-1. The configuration file analyzer 42 analyzes the configuration file 22-1 and identifies the service S-1 as a service that the configuration file processor 28 is to initiate when the configuration file processor 28 processes the configuration file 22-1. The configuration file analyzer 42 may identify services in the configuration file 22-1 in any suitable manner, such as by analyzing executable files identified in the configuration file 22-1, by identifying predetermined keyword instructions in the configuration file 22-1, or any other manner. In some implementations, the configuration file analyzer 42 may access a list of service identifiers 54 that identifies services. In particular, the list of service identifiers 54 may comprise a plurality of entries 56-1-56-4, each of which corresponds to a different service, and contains suitable information for the configuration file analyzer 42 to identify a service in a configuration file 22.

In this example, the entries 56-1-56-4 contain service identifiers and service types. The entry 56-1 contains a service identifier "S-1", and a service type of Identity Management (IM). The entry 56-2 contains a service identifier "S-2", and a service type of Database (DB). The entry 56-3 contains a service identifier "S-3", and a service type of Logging (LOG). The entry 56-4 contains a service identifier "S-N", and a service type of Identity Management (IM).

While not illustrated for the sake of simplicity, the configuration file 22-1 may include additional configuration files 22, sometimes referred to as nested configuration files. Thus, the identification of the service S-1 may not be explicitly in the configuration file 22-1, but rather in a nested configuration file that is identified in the configuration file 22-1. In such situations, the configuration file analyzer 42 analyzes the nested configuration files as the configuration file analyzer 42 encounters references to such nested configuration files in the configuration file 22-1.

The configuration file analyzer 42 may determine that the service S-1 is not currently executing on the computing device 12, and thus does not modify the configuration file 22-1. In some implementations, the computing device 12 may maintain a service information list 58 that identifies services that are currently executing on the computing device 12. In other implementations, the configuration file analyzer 42 may analyze the running processes that are executing on the computing device 12 and determine that the service S-1 is not currently executing.

In some implementations, the configuration file analyzer 42 may maintain information in a located services list 60 to keep track of which configuration files 22 initiate which services. In this example, the configuration file analyzer 42 adds an entry 62 to the located services list 60 that identifies the configuration file 22-1 as initiating the service S-1.

Figure 2B:
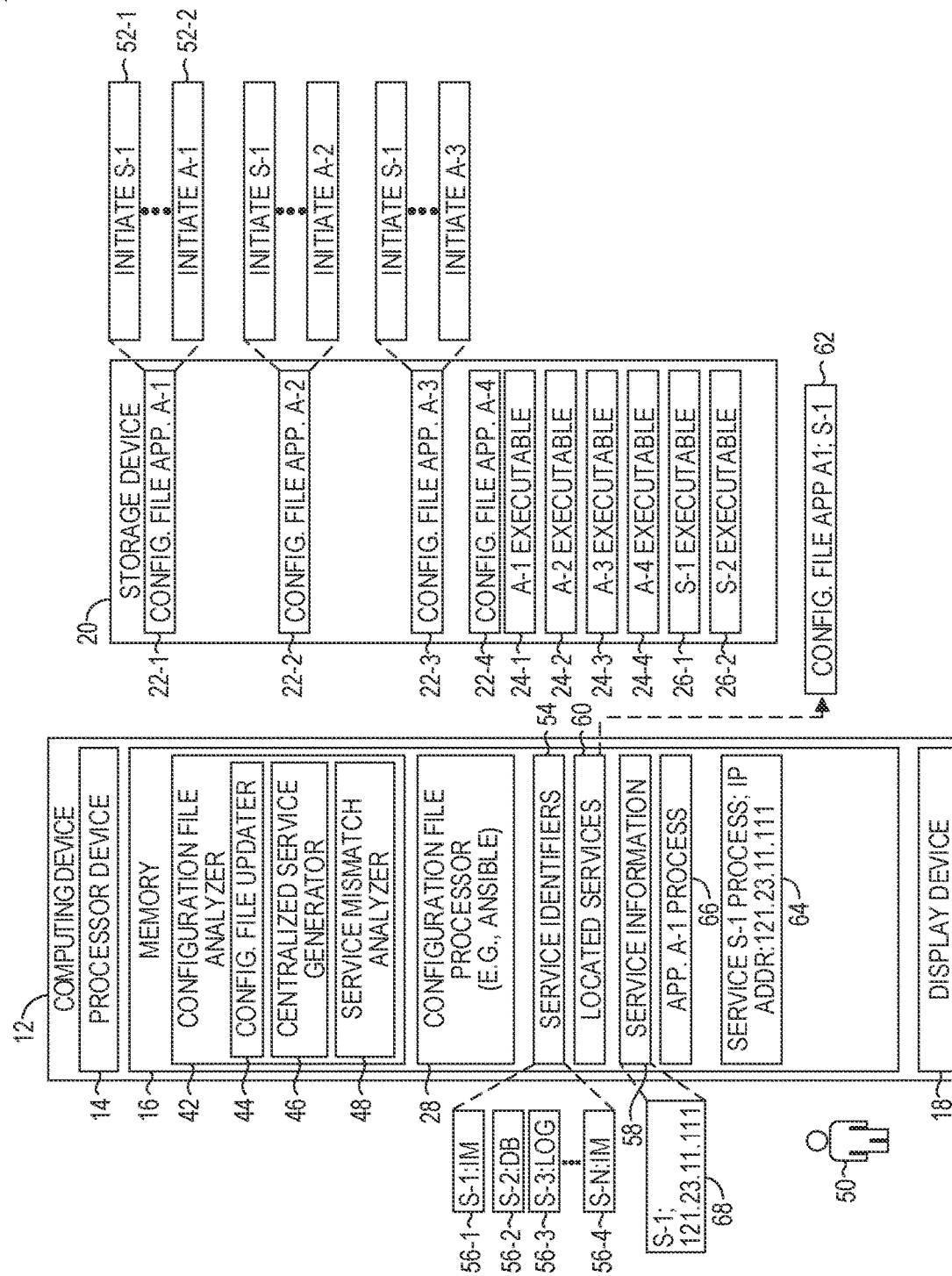

The configuration file analyzer 42 then returns control to the configuration file processor 28. Referring now to FIG. 2B, the configuration file processor 28 processes the configuration file 22-1 and, based on the instruction 52-1, executes the service executable file 26-1 to initiate the service S-1 as a service process 64. Based on the instruction 52-2, the configuration file processor 28 executes the application executable file 24-1 to initiate the application A-1 as an application process 66. The computing device 12 may add an entry 68 to the service information list 58 that identifies the service S-1 and an addressable location of the service S-1, in this example, the IP address 121.23.11.111.

Figure 2C:
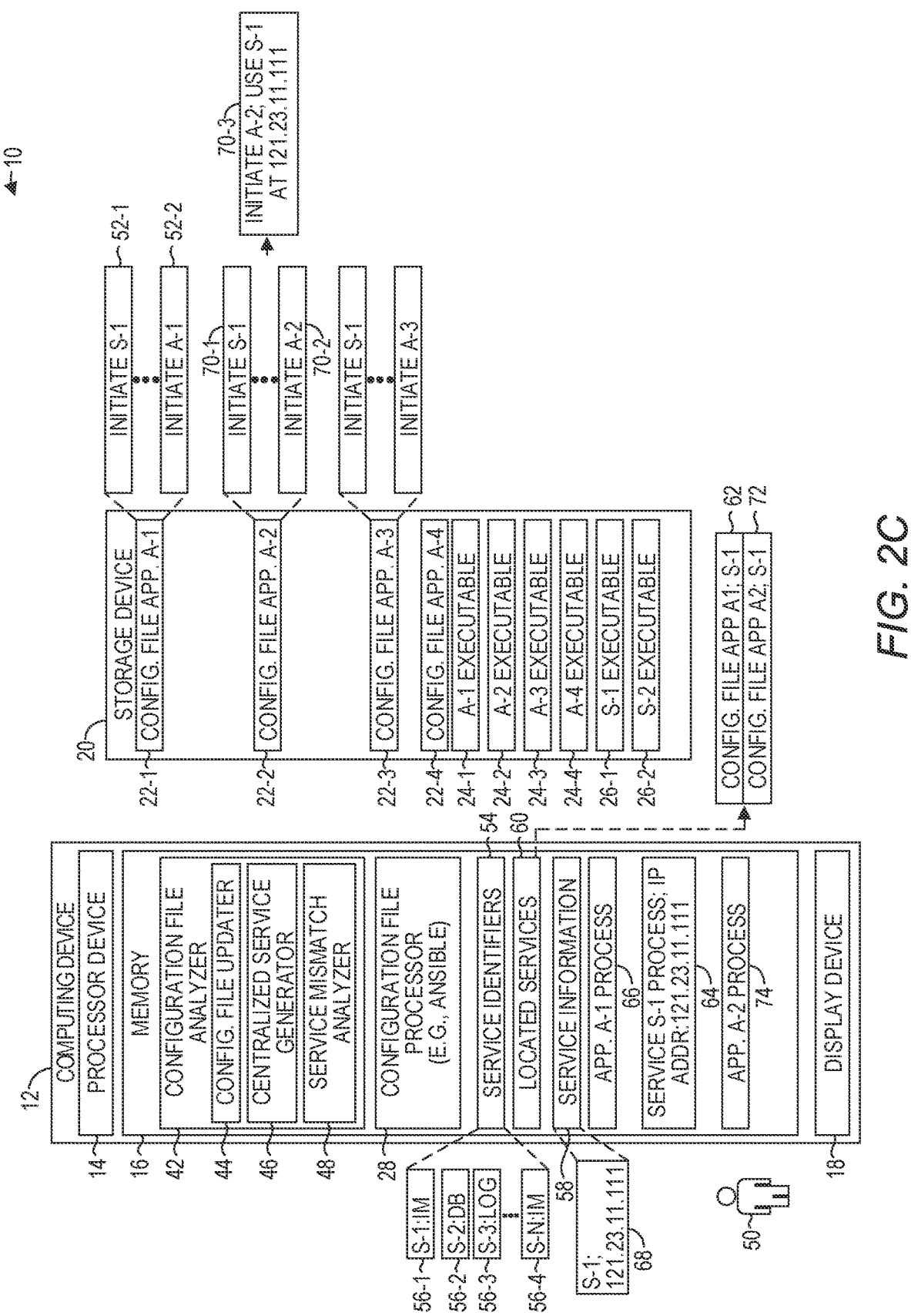

Referring now to FIG. 2C, the configuration file processor 28 receives an instruction, either programmatic or manually from the operator 50, to process the configuration file 22-2 in order to initiate the application A-2. Prior to processing the configuration file 22-2, the configuration file processor 28 causes the configuration file analyzer 42 to analyze the configuration file 22-2.

The configuration file 22-2 contains instructions 70-1 that, when processed, instruct the configuration file processor 28 to initiate the service S-1 from the service executable file 26-1, and instructions 70-2 that, when processed, instruct the configuration file processor 28 to initiate the application A-2 from the application executable file 24-2. The configuration file analyzer 42 analyzes the configuration file 22-2 and identifies the service S-1 as a service that the configuration file processor 28 is to initiate when the configuration file processor 28 processes the configuration file 22-2.

The configuration file analyzer 42 obtains service information that identifies service processes executing on the computing device 12. The service information may comprise, by way of non-limiting example, the service information list 58. In other implementations, the service information may comprise information obtained by the configuration file analyzer 42 that identifies the running processes on the computing device 12. The configuration file analyzer 42 determines, based on the service information, that the service S-1 is currently executing on the computing device 12. The configuration file analyzer 42 determines runtime information that identifies the service process 64, such as, in this example, an IP address of the service process 64. The configuration file updater 44 modifies the configuration file 22-2 to inhibit a subsequent execution of the service S-1 when the configuration file processor 28 processes the configuration file 22-2, and to instead reference the service process 64 on the computing device 12 using the runtime information of the service process 64, such that the application A-2, when initiated as an application process, utilizes the service process 64. In this example, the configuration file updater 44 modifies the instructions 70-1 and 70-2 to generate a new instruction 70-3. It should be apparent that the exact mechanism for accomplishing this may differ depending on the syntax required by the particular configuration file processor 28.

The configuration file analyzer 42 may add an entry 72 to the located services list 60 that identifies the configuration file 22-2 as initiating the service S-1. The configuration file analyzer 42 then returns control to the configuration file processor 28. The configuration file processor 28 processes the configuration file 22-2 and, based on the instruction 70-3, executes the application executable file 24-2 to initiate the application A-2 as an application process 74, and to use the service process 64 rather than initiate another copy of the service process 64.

Figure 2D:
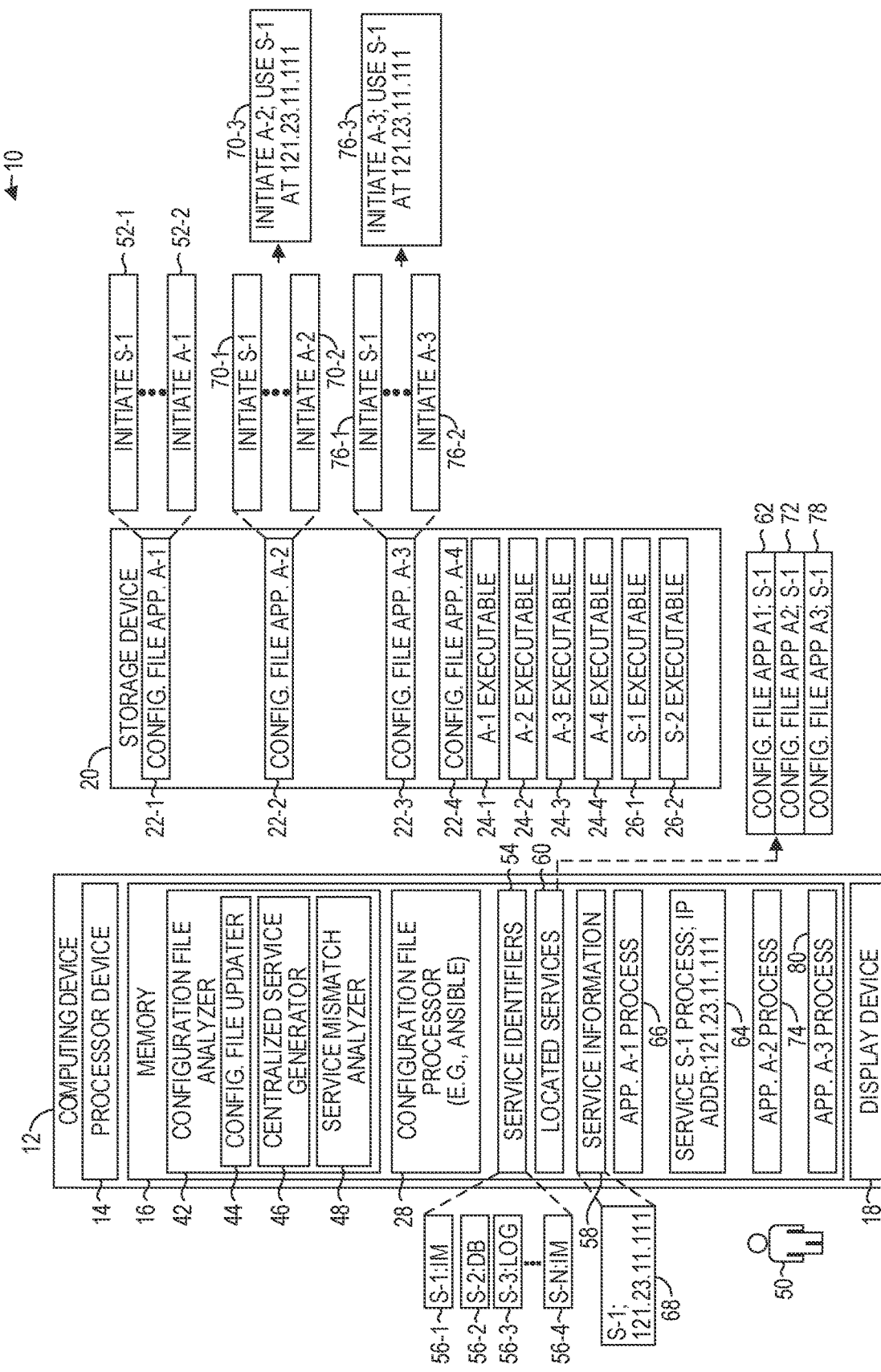

Referring now to FIG. 2D, the configuration file processor 28 receives an instruction, either programmatic or manually from the operator 50, to process the configuration file 22-3 in order to initiate the application A-3. Prior to processing the configuration file 22-3, the configuration file processor 28 causes the configuration file analyzer 42 to analyze the configuration file 22-3.

The configuration file 22-3 contains instructions 76-1 that, when processed, instruct the configuration file processor 28 to initiate the service S-1 from the service executable file 26-1, and instructions 76-2 that, when processed, instruct the configuration file processor 28 to initiate the application A-3 from the application executable file 24-3. The configuration file analyzer 42 analyzes the configuration file 22-3 and identifies the service S-1 as a service that the configuration file processor 28 is to initiate when the configuration file processor 28 processes the configuration file 22-3.

The configuration file analyzer 42 obtains the service information that identifies service processes executing on the computing device 12. The configuration file analyzer 42 determines, based on the service information, that the service S-1 is currently executing on the computing device 12. The configuration file updater 44 modifies the configuration file 22-3 to inhibit a subsequent execution of the service S-1 when the configuration file processor 28 processes the configuration file 22-3, and to instead reference the service process 64 on the computing device 12, such that the application A-3, when initiated as an application process, utilizes the service process 64. In this example, the configuration file updater 44 modifies the instructions 76-1 and 76-2 to generate a new instruction 76-3.

The configuration file analyzer 42 may add an entry 78 to the located services list 60 that identifies the configuration file 22-3 as initiating the service S-1. The configuration file analyzer 42 then returns control to the configuration file processor 28. The configuration file processor 28 processes the configuration file 22-3 and, based on the instruction 76-3, executes the application executable file 24-3 to initiate the application A-3 as an application process 80, and to use the service process 64 rather than initiate another copy of the service process 64.

Figure 3:
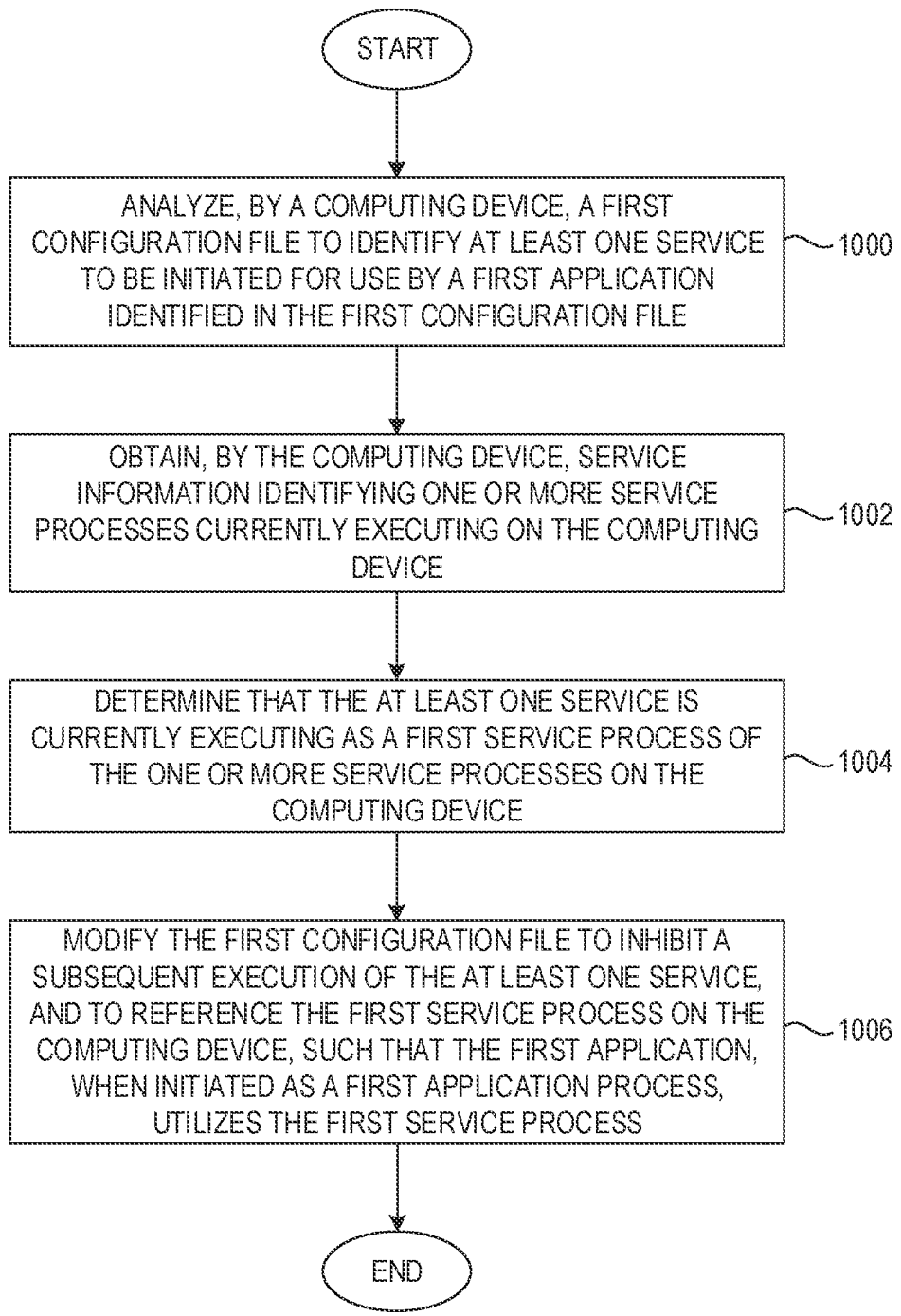
FIG. 3 is a flowchart of a method for automated runtime service optimization via modification of a configuration file according to one implementation.

FIG. 3 is a flowchart of a method for automated runtime service optimization via modification of a configuration file according to one implementation. FIG. 3 will be discussed in conjunction with FIGS. 2A-2D. The computing device 12 analyzes the configuration file 22-2 to identify the service S-1 to be initiated for use by the application A-2 identified in the configuration file 22-2 (FIG. 3, block 1000). The computing device 12 obtains service information, such as the service information list 58, identifying one or more service processes 64 currently executing on the computing device 12 (FIG. 3, block 1002). The computing device 12 determines that the service S-1 is currently executing as the service process 64 on the computing device 12 (FIG. 3, block 1004). The computing device 12 modifies the configuration file 22-2 to inhibit execution of the service S-1, and to reference the service process 64 on the computing device 12, such that the application A-2, when initiated as the application process 74, utilizes the service process 64 (FIG. 3, block 1006).

Figure 4:
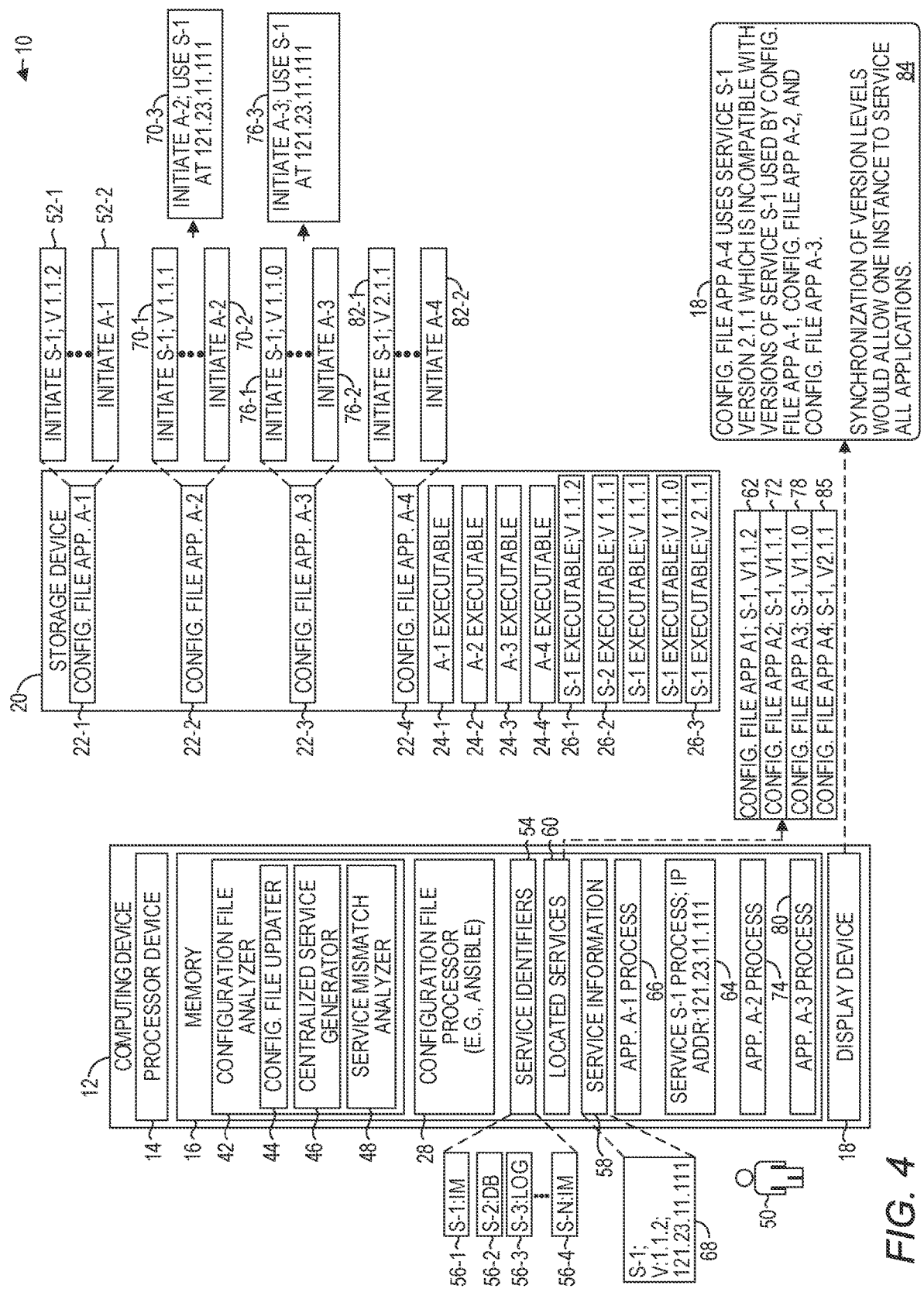
FIG. 4 is a block diagram of the environment illustrated in FIGS. 2A-2D that is suitable for implementing automated runtime service optimization according to another implementation.

FIG. 4 is a block diagram of the environment 10 according to another implementation. In this implementation, the configuration file analyzer 42 maintains track of version compatibility of the services S-1 and S-2. The version information may be identified in the configuration files 22. In this example, the configuration file 22-1 identifies a version 1.1.2 of the service S-1. The service information 58 may also maintain the version of service processes that are executing on the computing device 12. While analyzing the configuration file 22-2, the configuration file analyzer 42 determines that the configuration file 22-2 identifies a version 1.1.1 of the service S-1. The configuration file analyzer 42 determines that the version 1.1.2 of the service S-1 is compatible with the version 1.1.1 of the service S-1, and thus that the configuration file 22-2 can safely be modified to inhibit a subsequent execution of the service S-1 when the configuration file processor 28 processes the configuration file 22-2, and to instead reference the service process 64 on the computing device 12 using the runtime information of the service process 64, such that the application A-2, when initiated as an application process, utilizes the service process 64.

The configuration file analyzer 42 may make this determination in any number of ways. In some implementations, the configuration file analyzer 42 accesses a compatibility structure that identifies the compatibility of various versions of services. Compatibility may be one-way or two-way. Compatibility is one way when an application developed for a first version of a service can also utilize a second version of the service without modification, but an application that utilizes the second version of the service cannot utilize the first version of the service without modification.

In some implementations, the configuration file analyzer 42 may access version information to determine version compatibility. In some implementations, the structure of the version numbering itself may identify what versions are compatible. For example, a version number for a service may comprise three digits, a first digit followed by a period, a second digit followed by a period and a third digit. Versions that have the same first and second digits may be compatible irrespective of the third digit. Versions that have different second digits may be backward compatible. Versions with different first digits are incompatible.

While analyzing the configuration file 22-3, the configuration file analyzer 42 determines that the configuration file 22-3 identifies a version 1.1.0 of the service S-1. The configuration file analyzer 42 determines that the version 1.1.2 of the service S-1 is compatible with the version 1.1.0 of the service S-1, and thus that the configuration file 22-2 can safely be modified to inhibit a subsequent execution of the service S-1 when the configuration file processor 28 processes the configuration file 22-2, and to instead reference the service process 64 on the computing device 12 using the runtime information of the service process 64, such that the application A-3, when initiated as an application process, utilizes the service process 64.

Assume, for purposes of illustration, that the configuration file processor 28 receives an instruction, either programmatic or manually from the operator 50, to process the configuration file 22-4 in order to initiate the application A-4. Prior to processing the configuration file 22-4, the configuration file processor 28 causes the configuration file analyzer 42 to analyze the configuration file 22-4.

The configuration file 22-4 contains instructions 82-1 that, when processed, instruct the configuration file processor 28 to initiate a version 2.1.1 of the service S-1 from a service executable file 26-3, and instructions 82-2 that, when processed, instruct the configuration file processor 28 to initiate the application A-4 from the application executable file 24-4. The configuration file analyzer 42 analyzes the configuration file 22-4 and identifies the service S-1 as a service that the configuration file processor 28 is to initiate when the configuration file processor 28 processes the configuration file 22-4.

The configuration file analyzer 42 obtains the service information that identifies service processes executing on the computing device 12. The configuration file analyzer 42 determines, based on the service information, that version 1.1.2 of the service process 64 is currently executing on the computing device 12. The configuration file analyzer 42 determines that the version 2.1.1 of the service S-1 identified in the configuration file 22-4 is not compatible with the version 1.1.2 of the service process 64. In response, the configuration file analyzer 42 inhibits modification of the configuration file 22-4, and outputs information 84 identifying the service S-1 and the configuration file 22-4, and that indicates the configuration files 22-1-22-3 utilize a different version of the service S-1. The information 84 may also indicate that, if each of the applications A-1, A-2, A-3, and A-4 could utilize compatible versions of the service S-1, efficiencies would be gained. Such information may, for example, be presented on the display device 18 for viewing by the operator 50, written to a logfile, or the like. The configuration file analyzer 42 may add an entry 85 to the located services list 60 that identifies the configuration file 22-4 as initiating the service S-1. The configuration file analyzer 42 then returns control to the configuration file processor 28.

Figure 5:
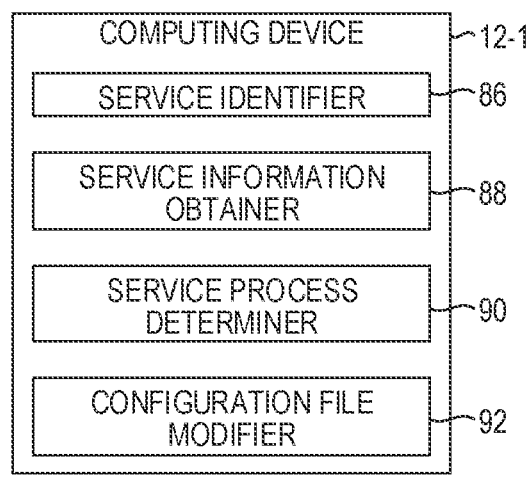
FIG. 5 is a block diagram of a computing device suitable for implementing automated runtime service optimization according to one implementation.

FIG. 5 is a block diagram of a computing device 12-1 suitable for implementing automated runtime service optimization according to one implementation. The computing device 12-1 implements identical functionality as that described above with regard to the computing device 12. The computing device 12-1 includes a service identifier 86 that is configured to analyze a first configuration file to identify at least one service to be initiated for use by a first application identified in the first configuration file.

The service identifier 86 may comprise executable software instructions configured to program a processor device to implement the functionality of analyzing a first configuration file to identify at least one service to be initiated for use by a first application identified in the first configuration file, may comprise circuitry including, by way of non-limiting example, an application-specific integrated circuit (ASIC), field-programmable gate array (FPGA), or may comprise a combination of executable software instructions and circuitry.

The computing device 12-1 also includes a service information obtainer 88 that is configured to obtain service information identifying one or more service processes currently executing on the computing device 12-1. The service information obtainer 88 may comprise executable software instructions configured to program a processor device to implement the functionality of obtaining service information identifying one or more service processes currently executing on the computing device 12-1, may comprise circuitry including, by way of non-limiting example, an ASIC, FPGA, or may comprise a combination of executable software instructions and circuitry.

The computing device 12-1 also includes a service process determiner 90 that is configured to obtain service information identifying one or more service processes currently executing on the computing device 12-1. The service process determiner 90 may comprise executable software instructions to program a processor device to implement the functionality of obtaining service information identifying one or more service processes currently executing on the computing device 12-1, may comprise circuitry including, by way of non-limiting example, an ASIC, FPGA, or may comprise a combination of executable software instructions and circuitry.

The computing device 12-1 also includes a configuration file modifier 92 that is configured to modify the first configuration file to inhibit a subsequent execution of the at least one service, and to reference the first service process on the computing device 12-1, such that the first application, when initiated as a first application process, utilizes the first service process. The configuration file modifier 92 may comprise executable software instructions to program a processor device to implement the functionality of inhibiting a subsequent execution of the at least one service, and to reference the first service process on the computing device 12-1, such that the first application, when initiated as a first application process, utilizes the first service process, may comprise circuitry including, by way of non-limiting example, an ASIC, FPGA, or may comprise a combination of executable software instructions and circuitry.

Figure 6:
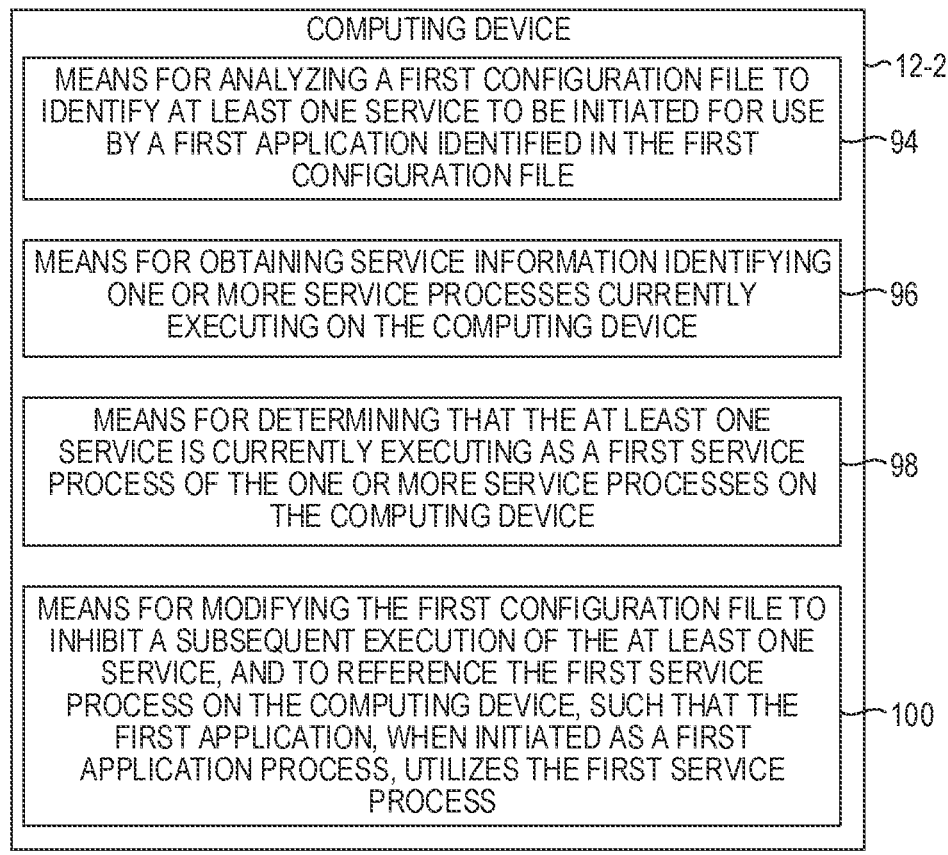
FIG. 6 is a block diagram of a computing device suitable for implementing automated runtime service optimization according to another implementation.

FIG. 6 is a block diagram of a computing device 12-2 suitable for implementing automated runtime service optimization according to one implementation. The computing device 12-2 implements identical functionality as that described above with regard to the computing device 12. In this implementation, the computing device 12-2 includes a means 94 for analyzing a first configuration file to identify at least one service to be initiated for use by a first application identified in the first configuration file. The means 94 may be implemented in any number of manners, including, for example, via the service identifier 86 illustrated in FIG. 5. The means 94 may, in some implementations, utilize the service information list 58 to identify the at least one service. In other implementations, the means 94 may utilize predetermined keywords used in the first configuration file.

The computing device 12-2 also includes a means 96 for obtaining service information identifying one or more service processes currently executing on the computing device 12-2. The means 96 may be implemented in any number of manners, including, for example, via the service information obtainer 88 illustrated in FIG. 5. The means 96 may, in some implementations, utilize the service information list 58 to identify one or more service processes currently executing on the computing device 12-2. In other implementations, the means 96 may request a list of all processes currently executing on the computing device 12-2 and analyze the list to identify one or more service processes currently executing on the computing device 12-2.

The computing device 12-2 also includes a means 98 for determining that the at least one service is currently executing as a first service process of the one or more service processes on the computing device 12-2. The means 98 may be implemented in any number of manners, including, for example, via the service process determiner 90 illustrated in FIG. 5. The means 98, in some implementations, searches the service information list 58 to determine that the at least one service is currently executing as a first service process of the one or more service processes on the computing device 12-2.

The computing device 12-2 also includes a means 100 for modifying the first configuration file to inhibit a subsequent execution of the at least one service, and to reference the first service process on the computing device, such that the first application, when initiated as a first application process, utilizes the first service process. The means 100 may be implemented in any number of manners, including, for example, via the configuration file modifier 92 illustrated in FIG. 5.

Figure 7:
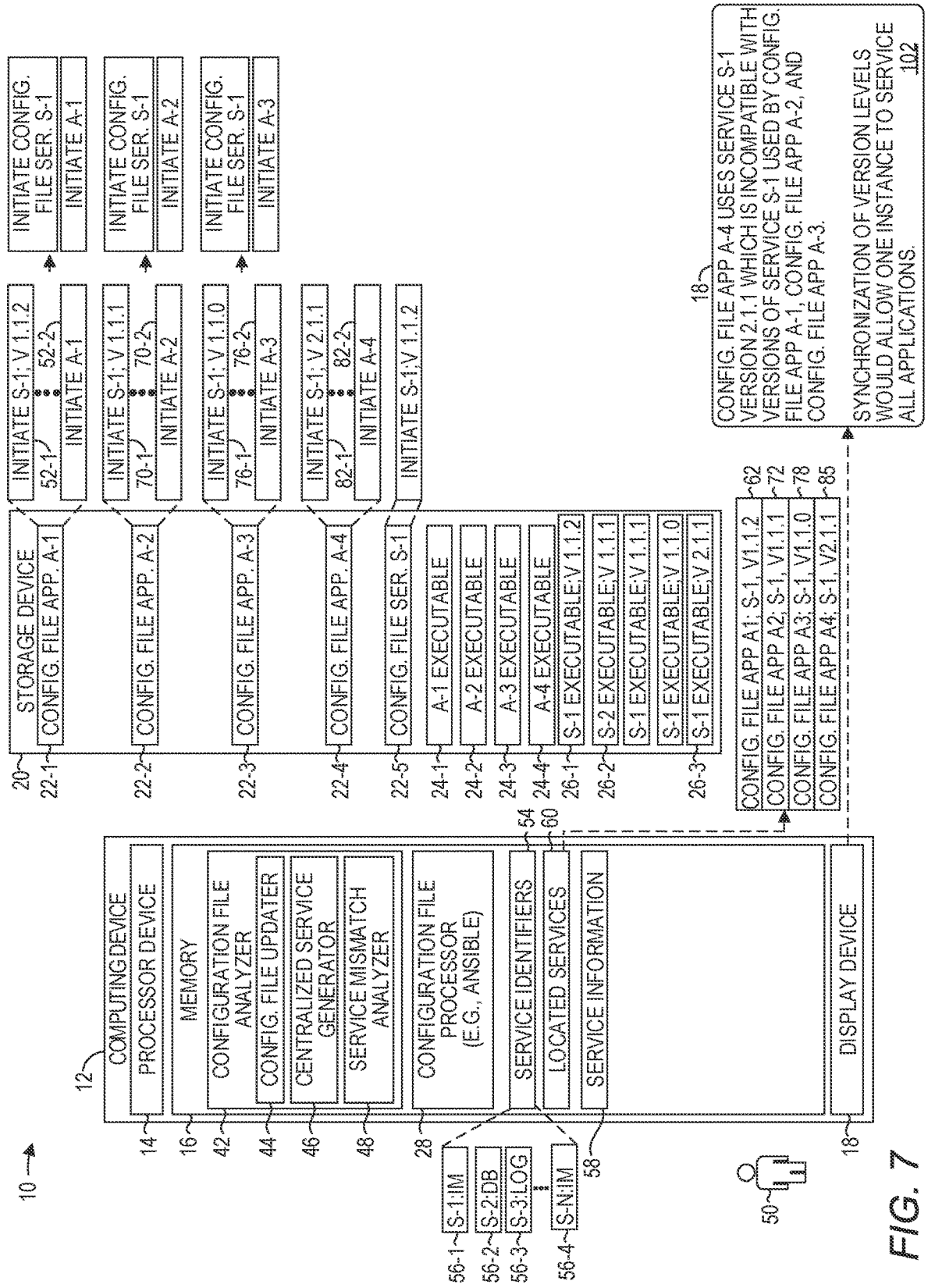
FIG. 7 is a block diagram of the environment illustrated in FIGS. 2A-2D illustrating a static analysis mode of a configuration file analyzer according to one implementation.

FIG. 7 is a block diagram of the environment 10 illustrating a static analysis mode of the configuration file analyzer 42 according to one implementation. In this example, the configuration file analyzer 42 analyzes the plurality of configuration files 22-1-22-4 to determine if the configuration files 22 access a same service and can therefore be modified to refer to the same service. In some implementations, the configuration file analyzer 42 may access the located services list 60 to determine which configuration files 22-1-22-4 access which services. In some implementations, configuration file analyzer 42, when executing in the runtime, dynamic mode, may store information that identifies configuration files 22 that may utilize the same service and that may be modified to refer to the same service for use by the configuration file analyzer 42 when executed in the static analysis mode.

In this example, the configuration file analyzer 42 analyzes the configuration files 22-1-22-4. The configuration file analyzer 42 determines that the configuration files 22-1-22-3 utilize the same service S-1, and that the version V.1.1.2 used by the configuration file 22-1 is compatible with the version V.1.1.1 used by the configuration file 22-2 and the version V.1.1.0 used by the configuration file 22-3, but that the configuration file 22-4 uses a version V.2.1.1 that is incompatible with the versions V.1.1.2, V.1.1.1, and V.1.1.0. These determinations may be made, for example, in the manner discussed above with regard to FIG. 4.

The configuration file analyzer 42 generates a new configuration file 22-5 that, when processed by the configuration file processor 28, initiates the service S1 from the service executable file 26-1. The configuration file analyzer 42 modifies the configuration file 22-1 to refer to the new configuration file 22-5 and to remove the previous reference to the service S1, such that when subsequently processed by the configuration file processor 28, the configuration file processor 28 accesses the configuration file 22-5. The configuration file analyzer 42 makes the same modifications to the configuration files 22-2 and 22-3. The service mismatch analyzer 48 determines that the configuration file 22-4 utilizes an incompatible version of the service S-1, and does not modify the configuration file 22-4. The service mismatch analyzer 48 may output information 102 identifying the service S-1 and the configuration file 22-4, and that indicates the configuration files 22-1-22-3 utilize a different version of the service S-1. The information 102 may also indicate that, if each of the applications A-1, A-2, A-3 and A-4 could utilize compatible versions of the service S-1, efficiencies would be gained. Such information may, for example, be presented on the display device 18 for viewing by the operator 50, written to a logfile, or the like.

Figure 8:
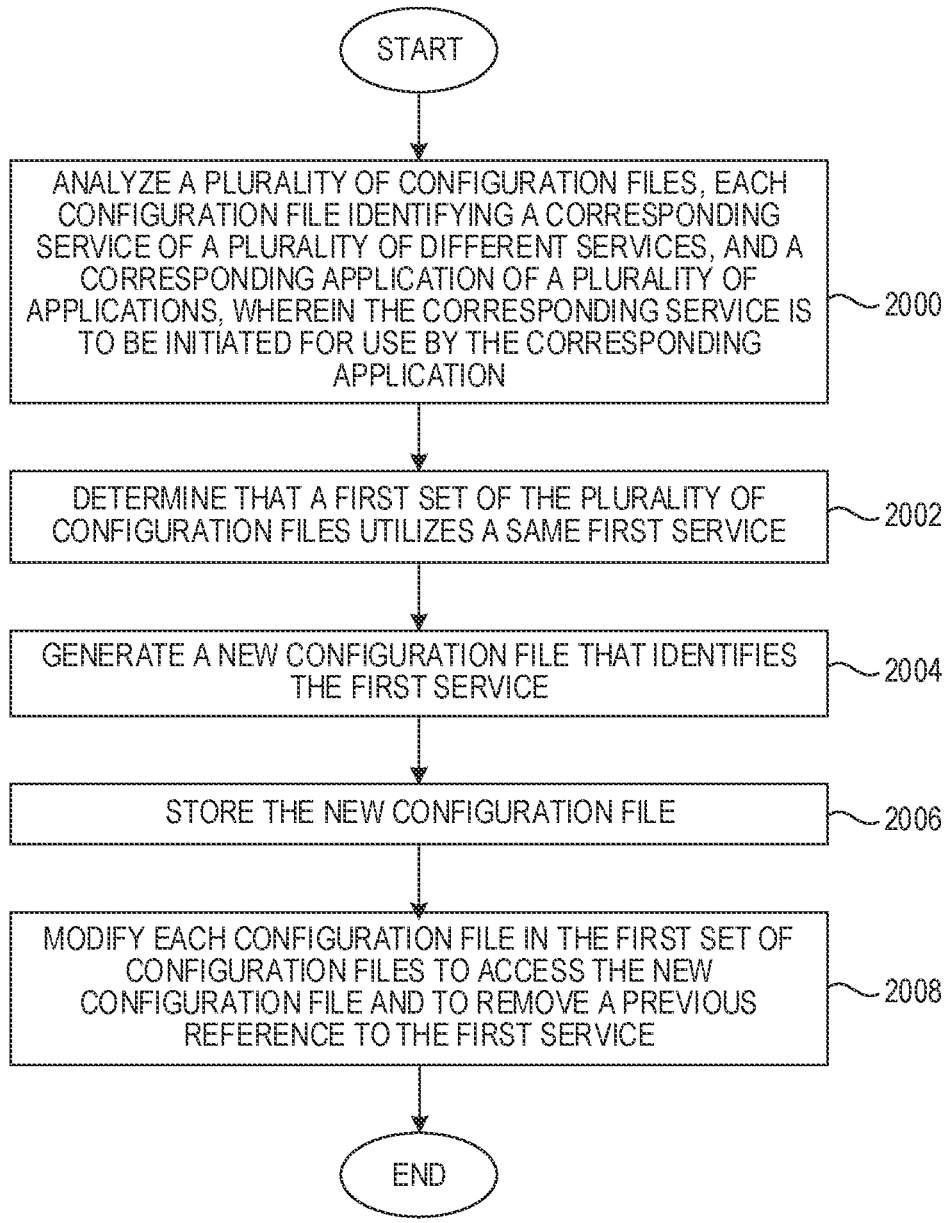
FIG. 8 is a flowchart of a method for automated runtime service optimization via modification of a configuration file during a static analysis mode of the configuration file analyzer according to one implementation.

FIG. 8 is a flowchart of a method for automated runtime service optimization via modification of a configuration file during the static analysis mode of the configuration file analyzer 42 according to one implementation. FIG. 8 will be discussed in conjunction with FIG. 7. The configuration file analyzer 42 analyzes the plurality of configuration files 22-1-22-4, each configuration file 22 identifying the corresponding service S-1, and a corresponding application of a plurality of applications A-1-A-4, wherein the corresponding service S-1 is to be initiated for use by the corresponding application A-1-A-4 (FIG. 8, block 2000). The configuration file analyzer 42 determines that the set of configuration files 22-1-22-3 utilizes the same first service S-1 (FIG. 8, block 2002). The configuration file analyzer 42 generates the new configuration file 22-5 that identifies the first service S-1 (FIG. 8, block 2004). The configuration file analyzer 42 stores the new configuration file 22-5 (FIG. 8, block 2006). The configuration file analyzer 42 modifies each configuration file 22-1-22-3 to access the new configuration file 22-5 and to remove a previous reference to the first service S-1 (FIG. 8, block 2008).

Figure 9:
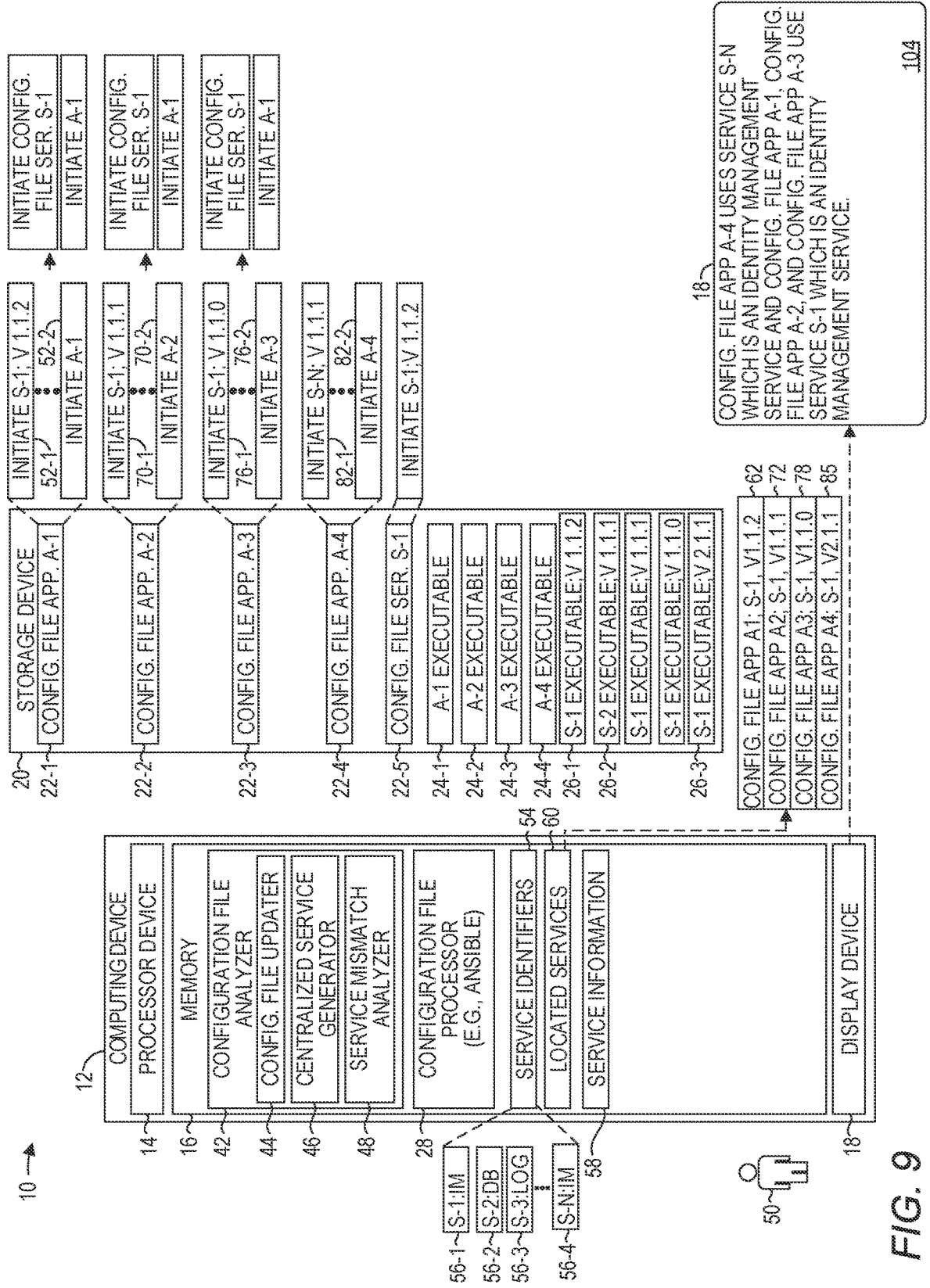
FIG. 9 is a block diagram of the environment illustrated in FIGS. 2A-2D illustrating a static analysis mode of the configuration file analyzer according to another implementation.

FIG. 9 is a block diagram of the environment 10 illustrating a static analysis mode of the configuration file analyzer 42 according to one implementation. In this example, the configuration file analyzer 42 analyzes the plurality of configuration files 22-1-22-5 to determine if the configuration files 22 access a same service and can therefore be modified to refer to the same service. The configuration file analyzer 42 determines that the configuration files 22-1-22-3 utilize the same service S-1, and that the version V.1.1.2 used by the configuration file 22-1 is compatible with the version V.1.1.1 used by the configuration file 22-2 and the version V.1.1.0 used by the configuration file 22-3. The configuration file analyzer 42 determines that the configuration file 22-4 uses a different identity management service S-N. The configuration file analyzer 42 may output information 104 identifying the configuration file 22-4 and information indicating that the configuration file 22-4 utilizes a different identity management service than the configuration files 22-1-22-3. The information 104 may, for example, be presented on the display device 18 for viewing by the operator 50, written to a logfile, or the like. The operator 50, or a software developer, may then modify the application A-4 to utilize the identity management service S-1 rather than the identity management service S-N, so that the applications A-1-A-4 can all be serviced by a single service process of the service S-1.

In another implementation, the configuration files 22-1-22-4 may identify service configurations for the services identified in the configuration files 22-1-22-4. Such service configurations may include, for example, a desired amount of memory, minimum version numbers, service configuration flags, and the like. The configuration file analyzer 42 may determine that certain service configurations are compatible, and that one or more other service configurations that utilize the same service are not compatible. The configuration file analyzer 42 may output information identifying the configuration files 22 with compatible service configurations and the configuration file(s) 22 with incompatible service configurations so that the operator 50, or a developer, can determine whether the configuration file(s) 22 with the incompatible service configuration can be modified to be compatible with the other configuration files 22.

Figure 10:
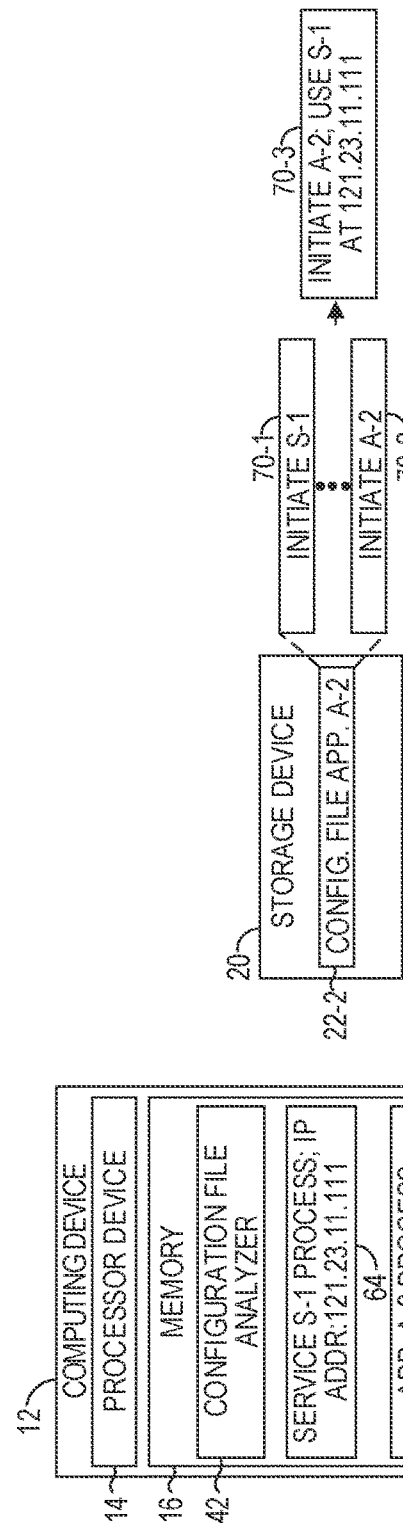
FIG. 10 is a simplified block diagram of the environment illustrated in FIGS. 2A-2D according to one implementation.

FIG. 10 is a simplified block diagram of the environment 10 according to one implementation. The computing device 12 includes the processor device 14 and the memory 16. The processor device 14 is coupled to the memory 16 to analyze the configuration file 22-2 to identify the service S-1 to be initiated for use by the application A-2 identified in the configuration file 22-2. The processor device 14 is further to obtain service information identifying the service process 64 currently executing on the computing device 12. The processor device 14 is further to determine that the service S-1 is currently executing as the service process 64 on the computing device 12. The processor device 14 is further to modify the configuration file 22-2 to inhibit a subsequent execution of the service S-1, and to reference the service process 64 on the computing device 12, such that the application A-2, when initiated as the application process 74, utilizes the service process 64.

Figure 11:
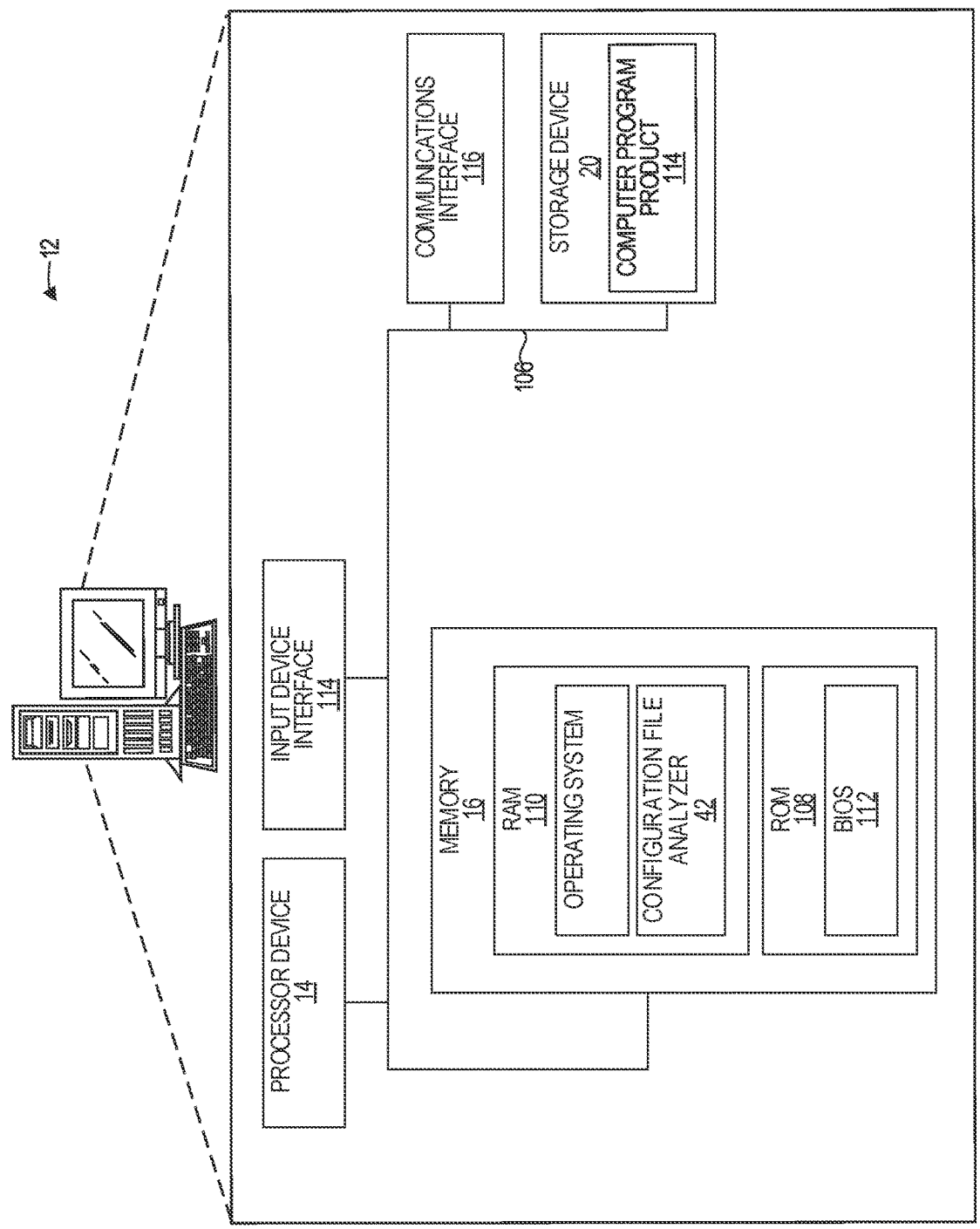
FIG. 11 is a block diagram of a computing device suitable for implementing the examples disclosed herein according to one implementation.

FIG. 11 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, or the like. The computing device 12 includes the processor device 14, the system memory 16, and a system bus 106. The system bus 106 provides an interface for system components including, but not limited to, the system memory 16 and the processor device 14. The processor device 14 can be any commercially available or proprietary processor.

The system bus 106 may be any of several types of bus structures that may further interconnect to a memory bus (with or without a memory controller), a peripheral bus, and/or a local bus using any of a variety of commercially available bus architectures. The system memory 16 may include non-volatile memory 108 (e.g., read-only memory (ROM), erasable programmable read-only memory (EPROM), electrically erasable programmable read-only memory (EEPROM), etc.), and volatile memory 110 (e.g., random-access memory (RAM)). A basic input/output system (BIOS) 112 may be stored in the non-volatile memory 108 and can include the basic routines that help to transfer information between elements within the computing device 12. The volatile memory 110 may also include a high-speed RAM, such as static RAM, for caching data.

The computing device 12 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20 and other drives associated with computer-readable media and computer-usable media may provide non-volatile storage of data, data structures, computer-executable instructions, and the like.

A number of modules can be stored in the storage device 20 and in the volatile memory 110, including an operating system and one or more program modules, such as the configuration file analyzer 42, which may implement the functionality described herein in whole or in part. All or a portion of the examples may be implemented as a computer program product 114 stored on a transitory or non-transitory computer-usable or computer-readable storage medium, such as the storage device 20, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the configuration file analyzer 42 in the volatile memory 110, may serve as a controller, or control system, for the computing device 12 that is to implement the functionality described herein.

The operator 50 may also be able to enter one or more configuration commands through a keyboard (not illustrated), a pointing device such as a mouse (not illustrated), or a touch-sensitive surface such as the display device 18. Such input devices may be connected to the processor device 14 through an input device interface 114 that is coupled to the system bus 106 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 116, such as an Ethernet transceiver, suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a method that includes analyzing a plurality of configuration files, each configuration file identifying a corresponding service of a plurality of different services, and a corresponding application of a plurality of applications, wherein the corresponding service is to be initiated for use by the corresponding application; determining that a first set of the plurality of configuration files utilizes a same first service; generating a new configuration file that identifies the first service; storing the new configuration file; and modifying each configuration file in the first set of configuration files to access the new configuration file and to remove a previous reference to the first service.

Example 2 is the method of example 1 that further includes determining that versions of the first service identified in each configuration file of the plurality of configuration files are compatible with each other.

Example 3 is the method of example 2, wherein a first version of the first service in a first configuration file of the first set of configuration files is different from a second version of the first service in a second configuration file, further including determining that the first version is compatible with the second version, and the second version is not compatible with the first version; and wherein generating the new configuration file that identifies the first service comprises generating the new configuration file that identifies the first service and that identifies the second version.

Example 4 is the method of example 1 that further includes determining that a first configuration file in a second set of configuration files uses a first service having a first service type and a first service identifier, and that a second configuration file in the second set of configuration files uses a second service having the first service type and a second service identifier that is a different service identifier than the first service identifier; and outputting information identifying the first configuration file and the second configuration file, and information indicating that the second configuration file uses the second service having the first service type and the second service identifier that is a different service identifier than the first service identifier.

Example 5 is the method of example 1 that further includes determining that a first configuration file in a second set of configuration files uses a first service having a first service type, a first service identifier and a first version, and that a second configuration file in the second set of configuration files uses a second service having the first service type, the first service identifier, and a second version; determining that the first version and the second version are not compatible with one another; and outputting information identifying the first configuration file and the second configuration file, and information indicating that the first configuration file and the second configuration file each use the first service, but use different versions.

Example 6 is the method of example 1 that further includes determining that a first configuration file in a second set of configuration files uses a first service having a first service type, a first service identifier and a first service configuration, and that a second configuration file in the second set of configuration files uses the first service having the first service type, the first service identifier, and a second service configuration; determining that the first service configuration and the second service configuration are different; and outputting information identifying the first configuration file and the second configuration file, and information indicating that the first configuration file and the second configuration file each use the first service, but use different service configurations.

Example 7 is the method of example 1 wherein each configuration file comprises an Ansible playbook.

Example 8 is the method of example 1 further comprising accessing a list of service identifiers, and determining that the first service is on the list of service identifiers.

Example 9 is the method of example 1 wherein the first service comprises one of a database service and an identity management service.

Example 10 is a computing device that includes a memory, and a processor device coupled to the memory to analyze a plurality of configuration files, each configuration file identifying a corresponding service of a plurality of different services, and a corresponding application of a plurality of applications, wherein the corresponding service is to be initiated for use by the corresponding application; determine that a first set of the plurality of configuration files utilizes a same first service; generate a new configuration file that identifies the first service; store the new configuration file; and modify each configuration file in the first set of configuration files to access the new configuration file and to remove a previous reference to the first service.

Example 11 is the computing device of example 10 wherein the processor device is further to determine that a first configuration file in a second set of configuration files uses a first service having a first service type and a first service identifier, and that a second configuration file in the second set of configuration files uses a second service having the first service type and a second service identifier that is a different service identifier than the first service identifier; and output information identifying the first configuration file and the second configuration file, and information indicating that the second configuration file uses the second service having the first service type and the second service identifier that is a different service identifier than the first service identifier.

Example 12 is the computing device of example 10 wherein the processor device is further to determine that a first configuration file in a second set of configuration files uses a first service having a first service type, a first service identifier and a first version, and that a second configuration file in the second set of configuration files uses a second service having the first service type, the first service identifier, and a second version; determine that the first version and the second version are not compatible with one another; and output information identifying the first configuration file and the second configuration file, and information indicating that the first configuration file and the second configuration file each use the first service, but use different versions.

Example 13 is a non-transitory computer-readable storage medium that includes executable instructions to cause a processor device to analyze a plurality of configuration files, each configuration file identifying a corresponding service of a plurality of different services, and a corresponding application of a plurality of applications, wherein the corresponding service is to be initiated for use by the corresponding application; determine that a first set of the plurality of configuration files utilizes a same first service; generate a new configuration file that identifies the first service; store the new configuration file; and modify each configuration file in the first set of configuration files to access the new configuration file and to remove a previous reference to the first service.

Example 14 is computing device that includes means for analyzing a first configuration file to identify at least one service to be initiated for use by a first application identified in the first configuration file; means for obtaining service information identifying one or more service processes currently executing on the computing device; means for determining that the at least one service is currently executing as a first service process of the one or more service processes on the computing device; and means for modifying the first configuration file to inhibit a subsequent execution of the at least one service, and to reference the first service process on the computing device, such that the first application, when initiated as a first application process, utilizes the first service process.

Example 15 is computing device that includes a service identifier that is configured to analyze a first configuration file to identify at least one service to be initiated for use by a first application identified in the first configuration file; a service information obtainer that is configured to obtain service information identifying one or more service processes currently executing on the computing device; and a configuration file modifier that is configured to modify the first configuration file to inhibit a subsequent execution of the at least one service, and to reference the first service process on the computing device, such that the first application, when initiated as a first application process, utilizes the first service process.

Individuals will recognize improvements and modifications to the preferred examples of the disclosure. All such improvements and modifications are considered within the scope of the concepts disclosed herein and the claims that follow.

What is claimed is:

1. A method comprising:
analyzing, by a computing device, a first configuration file to identify at least one service to be initiated for use by a first application identified in the first configuration file;
obtaining, by the computing device, service information identifying one or more service processes currently executing on the computing device;
determining that the at least one service is currently executing as a first service process of the one or more service processes on the computing device; and
modifying the first configuration file to inhibit a subsequent execution of the at least one service, and to reference the first service process on the computing device, such that the first application, when initiated as a first application process, utilizes the first service process.

2. The method of claim 1 wherein analyzing the first configuration file is in response to a request to process the first configuration file to initiate the first application.

3. The method of claim 1 further comprising processing the first configuration file to implement a plurality of actions identified in the first configuration file, the plurality of actions including initiating the first application as the first application process.

4. The method of claim 1 wherein analyzing the first configuration file to identify the at least one service further comprises accessing a list of service identifiers, and determining that the at least one service is on the list of service identifiers.

5. The method of claim 1 further comprising adding, to a list of located services, a name of the first configuration file and a service identifier that identifies the at least one service.

6. The method of claim 1 wherein the first configuration file comprises an Ansible playbook.

7. The method of claim 1 wherein the first configuration file identifies a nested first configuration file, and the nested first configuration file identifies the at least one service.

8. The method of claim 1 wherein determining that the at least one service is currently executing as the first service process of the one or more service processes on the computing device further comprises:
determining a particular version, of a plurality of different potential versions, of the at least one service; and
determining that a version of the first service process is compatible with the particular version.

9. The method of claim 8 wherein the particular version is a different version than the version of the first service process.

10. The method of claim 1 further comprising:
analyzing a second configuration file to identify a second service to be initiated for use by a second application;
obtaining the service information identifying one or more service processes currently executing on the computing device;
determining that the second service is not currently executing on the computing device; and
in response to determining that the second service is not currently executing on the computing device, inhibiting modification of the second configuration file.

11. The method of claim 10 further comprising:
determining that the second service is identified in another configuration file; and
outputting information identifying the second service, the second configuration file, and information that indicates another configuration file utilizes the second service.

12. The method of claim 1 further comprising:
analyzing a second configuration file to identify a second service to be initiated for use by a second application;
determining a particular version, of a plurality of different potential versions, of the second service;
obtaining the service information identifying one or more service processes currently executing on the computing device;
determining that the second service is currently executing as a second service process on the computing device, wherein the second service process is a version that is incompatible with the particular version; and
in response to determining that the second service process is the version that is incompatible with the particular version:
inhibiting modification of the second configuration file; and
outputting information identifying the second service and the second configuration file, and information that indicates another configuration file utilizes a different version of the second service.

13. The method of claim 1 wherein the at least one service comprises one of a database service and an identity management service.

14. The method of claim 1 wherein modifying the first configuration file to inhibit a subsequent execution of the at least one service, and to reference the first service process on the computing device, further comprises:
determining runtime information that identifies the first service process; and
modifying the first configuration file to include the runtime information.

15. A computing device, comprising:
a memory; and
a processor device coupled to the memory to:
analyze a first configuration file to identify at least one service to be initiated for use by a first application identified in the first configuration file;
obtain service information identifying one or more service processes currently executing on the computing device;
determine that the at least one service is currently executing as a first service process of the one or more service processes on the computing device; and modify the first configuration file to inhibit a subsequent execution of the at least one service, and to reference the first service process on the computing device, such that the first application, when initiated as a first application process, utilizes the first service process.

16. The computing device of claim 15 wherein the processor device is further to process the first configuration file to implement a plurality of actions identified in the first configuration file, the plurality of actions including initiating the first application as the first application process.

17. The computing device of claim 15 wherein to modify the first configuration file to inhibit a subsequent execution of the at least one service, and to reference the first service process on the computing device, the processor device is further to:
  determine runtime information that identifies the first service process; and
  modify the first configuration file to include the runtime information.

18. A non-transitory computer-readable storage medium that includes executable instructions to cause a processor device to:
  analyze a first configuration file to identify at least one service to be initiated for use by a first application identified in the first configuration file;
  obtain service information identifying one or more service processes currently executing on the computing device;
  determine that the at least one service is currently executing as a first service process of the one or more service processes on the computing device; and
  modify the first configuration file to inhibit a subsequent execution of the at least one service, and to reference the first service process on the computing device, such that the first application, when initiated as a first application process, utilizes the first service process.

19. The non-transitory computer-readable storage medium of claim 18 wherein the instructions further cause the processor device to process the first configuration file to implement a plurality of actions identified in the first configuration file, the plurality of actions including initiating the first application as the first application process.

20. The non-transitory computer-readable storage medium of claim 18 wherein to modify the first configuration file to inhibit a subsequent execution of the at least one service, and to reference the first service process on the computing device, the instructions further cause the processor device to:
  determine runtime information that identifies the first service process; and
  modify the first configuration file to include the runtime information.

* * * * *